United States Patent
Xue

(10) Patent No.: US 8,184,184 B2
(45) Date of Patent: May 22, 2012

(54) ANALOG MULTIPLEXER CONFIGURED TO REDUCE KICKBACK PERTURBATION IN IMAGE SENSOR READOUT

(75) Inventor: Song Xue, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 771 days.

(21) Appl. No.: 12/329,832

(22) Filed: Dec. 8, 2008

(65) Prior Publication Data

US 2010/0141822 A1    Jun. 10, 2010

(51) Int. Cl.
*H04N 3/14* (2006.01)
(52) U.S. Cl. ......................... 348/294; 348/308
(58) Field of Classification Search .................. 348/272, 348/273, 280, 281, 308, 222.1, 294
See application file for complete search history.

(56) References Cited

U.S. PATENT DOCUMENTS

| | | | |
|---|---|---|---|
| 3,971,065 A | 7/1976 | Bayer | |
| 2006/0050162 A1 | 3/2006 | Nakamura | |
| 2007/0024931 A1 | 2/2007 | Compton et al. | |
| 2008/0074521 A1* | 3/2008 | Olsen | 348/300 |

OTHER PUBLICATIONS

Razavi B: "Design of sample-and-hold amplifiers for high-speed low-voltage A/D converters", Custom Integrated Circuits Conference, 1997., Proceedings of the IEEE 1997 Santa Clara, CA, USA, May 5-8, 1997, New York, NY, USA, IEEE, US, May 5, 1997, pp. 59-66, XP010235263, ISBN: 978-0-7803-3669-8, Figure 6b, the whole document.

Razavi B: "Design of a 100-MHZ 10-MW 3-V, Sample-and-Hold Amplifier in Digital Bipolar Technology", IEEE Journal of Solid-State Circuits, IEEE Service Center, Piscataway, NJ, US, vol. 30, No. 7, Jul. 1, 1995, pp. 724-730, XP000523422, ISSN: 0018-9200, Chapters III-IV figures 3b, 19.

* cited by examiner

*Primary Examiner* — Mohammed Hasan
(74) *Attorney, Agent, or Firm* — Blakely Sokoloff Taylor & Zafman LLP

(57) ABSTRACT

An analog multiplexer is configured to multiplex a plurality of input analog signal channels into a single output analog signal channel. The analog multiplexer comprises a plurality of input sampling circuits associated with respective ones of the input analog signal channels and an amplifier having an input controllably connectable in turn to each of the input sampling circuits. The analog multiplexer is further configured to connect at least a given one of the input analog signal channels to a sampling element of its corresponding input sampling circuit at a predetermined time prior to connecting the sampling element of that input sampling circuit to the input of the amplifier. The predetermined time is less than a full clock cycle of a sampling clock of the amplifier. The analog multiplexer may be implemented in readout circuitry coupled to a pixel array in an image sensor.

17 Claims, 5 Drawing Sheets

ANALOG MULTIPLEXER CONFIGURED TO REDUCE KICKBACK PERTURBATION IN IMAGE SENSOR READOUT

FIELD OF THE INVENTION

The present invention relates generally to electronic circuitry, and more particularly to analog multiplexing circuitry that may be used, for example, in conjunction with image sensor readout in digital cameras and other types of imaging devices.

BACKGROUND OF THE INVENTION

A typical electronic image sensor comprises a number of photodiodes or other photosensitive elements arranged in a two-dimensional array. These elements are also commonly referred to as picture elements or "pixels" and the corresponding array is referred to as a pixel array. Light incident on the pixel array is converted to electrical charge by the photosensitive elements. Collected electrical charge for a given image capture period is read from the photosensitive elements of the pixel array using an active pixel sensor (APS) or charge-coupled device (CCD) arrangement In order to read out the pixel array at high speed, it is often necessary to share certain signal processing circuitry between multiple analog readout channels. Such multiple-channel readout arrangements generally involve multiplexing several low-speed analog channels into a single high-speed analog channel. For example, in a typical APS image sensor implemented using complementary metal-oxide-semiconductor (CMOS) circuitry, also referred to herein as a CMOS image sensor, the low-speed channels may correspond to respective columns of the pixel array, and each of the low-speed channels may include an analog signal processor (ASP) and a programmable gain amplifier (PGA). The high-speed analog channel may include a high-speed PGA or a sample-and-hold amplifier coupled to an analog-to-digital converter (ADC) which converts analog signals read from the pixel array into digital image data.

Unfortunately, significant problems can arise when multiplexing several low-speed analog channels into a single high-speed analog channel. For example, input switching operations associated with the high-speed PGA may disrupt the proper operation of the low-speed PGAs. Conventional analog multiplexers are unable to provide an adequate solution to these problems. Accordingly, a need exists for an improved analog multiplexing arrangement for use in a CMOS image sensor or other type of electronic image sensor in which multiple low-speed analog channels are multiplexed into a single high-speed analog channel in conjunction with image readout.

SUMMARY OF THE INVENTION

Illustrative embodiments of the invention provide an analog multiplexer for facilitating high-speed readout of an image sensor.

In accordance with one aspect of the invention, an analog multiplexer is configured to multiplex a plurality of input analog signal channels into a single output analog signal channel. The analog multiplexer comprises a plurality of input sampling circuits associated with respective ones of the input analog signal channels and an amplifier having an input controllably connectable in turn to each of the input sampling circuits. The analog multiplexer is further configured to connect at least a given one of the input analog signal channels to a sampling capacitor or other sampling element of its corresponding input sampling circuit at a predetermined time prior to connecting the sampling element of that input sampling circuit to the input of the amplifier. The predetermined time is less than a full clock cycle of a sampling clock of the amplifier. For example, in an arrangement in which two input analog signal channels are multiplexed into a single output analog signal channel, the predetermined time may be approximately one half of the full clock cycle of the amplifier sampling clock.

In one of the illustrative embodiments, the given input sampling circuit comprises positive and negative inputs coupled to respective positive and negative differential signal lines of the corresponding input analog signal channel and the amplifier comprises a differential amplifier having positive and negative inputs. The analog multiplexer in this embodiment is configured to connect the positive and negative inputs of the given input sampling circuit to respective first plates of respective first and second sampling capacitors at the predetermined time prior to connecting respective second plates of the first and second sampling capacitors to the respective positive and negative inputs of the differential amplifier.

The given input sampling circuit of the analog multiplexer in the illustrative embodiment may more particularly comprise a set of nine switches, including a first switch coupled between the positive input of the input sampling circuit and a first plate of a first sampling capacitor, a second switch coupled between the negative input of the input sampling circuit and a first plate of a second sampling capacitor, third and fourth switches coupled between respective second plates of the first and second sampling capacitors and a common mode voltage reference, and fifth and sixth switches arranged in series with the respective first and second switches and the respective first and second sampling capacitors in the respective positive and negative signal paths and coupled between the respective second plates of the first and second sampling capacitors and the respective positive and negative inputs of the differential amplifier. The analog multiplexer may further include seventh and eighth switches coupled between the respective first plates of the first and second sampling capacitors and respective upper and lower voltage references, and a ninth switch coupled between the respective first plates of the first and second sampling capacitors.

In accordance with another aspect of the invention, the analog multiplexer may be implemented in readout circuitry associated with a pixel array of an image sensor. Such readout circuitry may be, for example, integrated with the pixel array in an image sensor integrated circuit. An image sensor in accordance with the invention may be implemented in a digital camera or other type of imaging device.

The illustrative embodiments advantageously reduce or eliminate kickback perturbations attributable to input switching of high-speed channel elements such as PGAs or DACs, thereby improving image sensor readout performance.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present invention will be illustrated herein in conjunction with particular embodiments of digital cameras, image sensors and associated readout circuitry. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of imaging devices, image sensors and associated readout circuitry. Moreover, the analog multiplexing techniques of the invention can be implemented in applications other than those involving image sensor readout.

Figure 1:
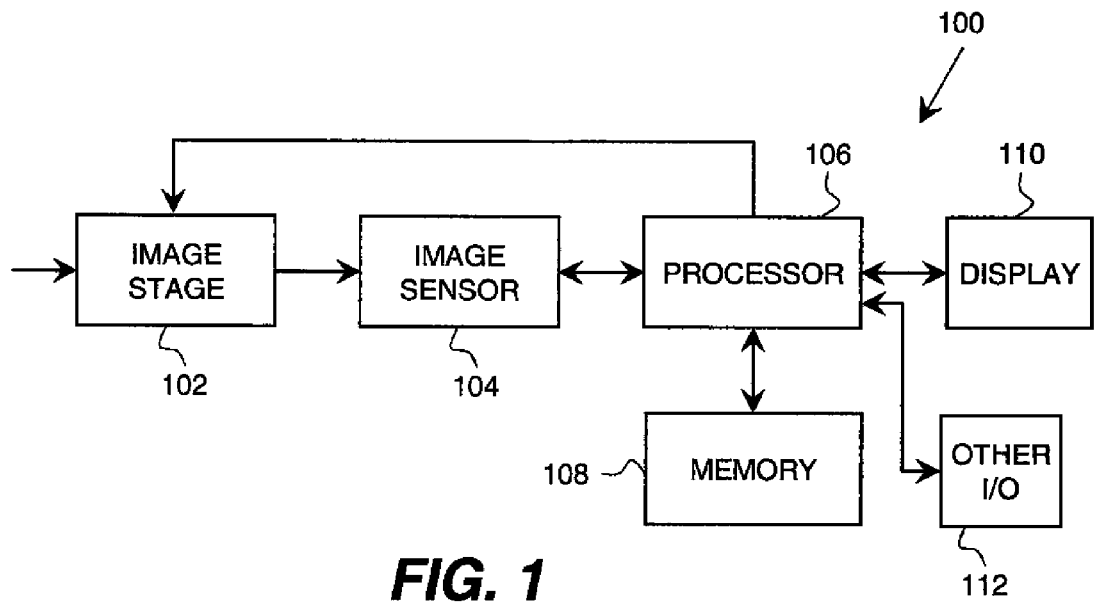
FIG. 1 is a block diagram of a digital camera having a CMOS image sensor configured in accordance with an illustrative embodiment of the invention.

FIG. 1 shows a digital camera 100 in an illustrative embodiment of the invention. In the digital camera, light from a subject scene is input to an imaging stage 102. The imaging stage may comprise conventional elements such as a lens, a neutral density filter, an iris and a shutter. The light is focused by the imaging stage 102 to form an image on an image sensor 104, which converts the incident light to electrical signals. The digital camera 100 further includes a processor 106, a memory 108, a display 110, and one or more additional input/output (I/O) elements 112.

Although shown as separate elements in the embodiment of FIG. 1, the imaging stage 102 may be integrated with the image sensor 104, and possibly one or more additional elements of the digital camera 100, to form a compact camera module.

The image sensor 104 is assumed to be a CMOS image sensor, although the invention can be implemented using other types of image sensors, including, for example, CCD image sensors. The image sensor generally comprises a pixel array having a plurality of pixels arranged in rows and columns and may include additional circuitry associated with readout of the pixel array. As will be described in greater detail below, this additional circuitry may comprise, for example, an ASP for processing analog signals read out from the pixel array, one or more PGAs for amplifying such signals, and an ADC for converting such signals to a digital form. Portions of such readout circuitry may be arranged external to the image sensor, or formed integrally with the pixel array, for example, on a common integrated circuit with photosensitive elements and other elements of the pixel array.

The image sensor 104 will typically be implemented as a color image sensor having an associated color filter array (CEA) pattern. One type of CFA pattern that may be used in the image sensor 104 is the well-known Bayer pattern, disclosed in U.S. Pat. No. 3,971,065, entitled "Color Imaging Array," which is incorporated by reference herein. Other examples of CFA patterns that may be used in image sensor 104 include those disclosed in U.S. Patent Application Publication No. 2007/0024931, entitled "Image Sensor with Improved Light Sensitivity," which is incorporated by reference herein. These include patterns which provide certain of the pixels with a panchromatic photoresponse. Such patterns are also generally referred to herein as "sparse" CFA patterns. Image sensors configured with sparse CFA patterns exhibit greater light sensitivity and are thus well-suited for use in applications involving low scene lighting, short exposure time, small aperture, or other restrictions on the amount of light reaching the image sensor.

The processor 106 may comprise, for example, a microprocessor, a central processing unit (CPU), an application-specific integrated circuit (ASIC), a digital signal processor (DSP), or other processing device, or combinations of multiple such devices. Various elements of the imaging stage 102 and the image sensor 104 may be controlled by timing signals or other signals supplied from the processor 106.

The memory 108 may comprise any type of memory, such as, for example, random access memory (RAM), read-only memory (ROM), Flash memory, disk-based memory, removable memory, or other types of storage elements, in any combination.

Functionality associated with readout of the pixel array and the processing of corresponding image data may be implemented at least in part in the form of software that is stored in memory 108 and executed by processor 106.

A given image captured by the image sensor 104 may be stored by the processor 106 in memory 108 and presented on display 110. The display 110 is typically an active matrix color liquid crystal display (LCD), although other types of displays may be used. The additional I/O elements 112 may comprise, for example, various on-screen controls, buttons or other user interfaces, network interfaces, memory card interfaces, etc.

Additional details regarding the operation of a digital camera of the type shown in FIG. 1 can be found, for example, in the above-cited U.S. Patent Application Publication No. 2007/0024931.

It is to be appreciated that the digital camera as shown in FIG. 1 may comprise additional or alternative elements of a type known to those skilled in the art. Elements not specifically shown or described herein may be selected from those known in the art. As noted previously, the present invention may be implemented in a wide variety of other types of digital cameras or imaging devices. Also, as mentioned above, certain aspects of the embodiments described herein may be implemented at least in part in the form of software executed by one or more processing elements of an imaging device. Such software can be implemented in a straightforward manner given the teachings provided herein, as will be appreciated by those skilled in the art.

Figure 2:
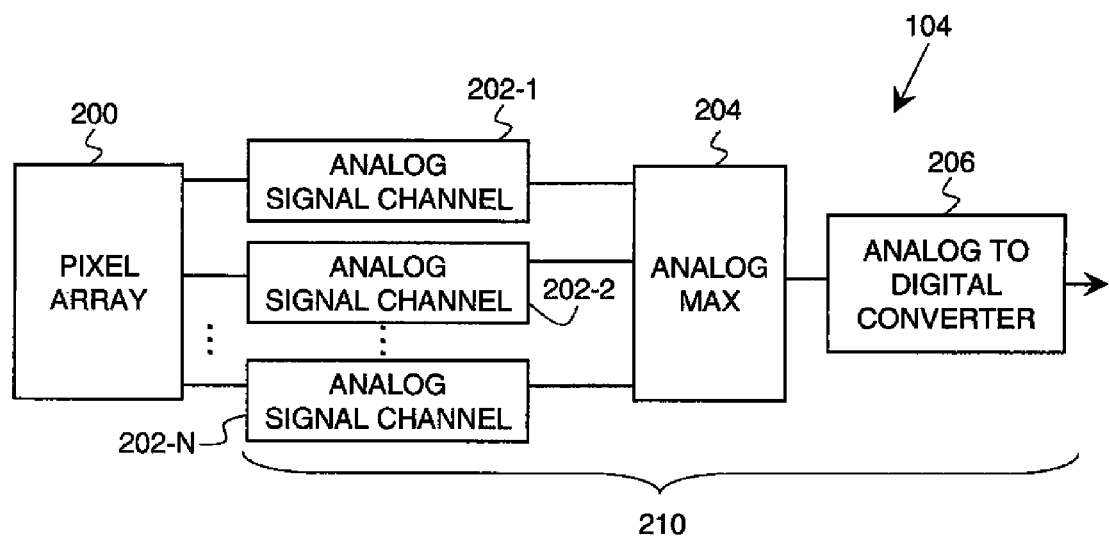
FIG. 2 is a block diagram showing a more detailed view of a portion of the CMOS image sensor of the digital camera of FIG. 1.

FIG. 2 shows a more detailed view of the image sensor 104 in the digital camera 100 of FIG. 1. The image sensor 104 in this embodiment comprises a pixel array 200 that is coupled via a plurality of analog signal channels 202-1, 202-2, . . . 202-N to an analog multiplexer 204. The pixel array typically comprises a plurality of photosensitive elements arranged in rows and columns. The photosensitive elements may comprise, for example, photodiodes or photocapacitors. The output of the analog multiplexer is coupled to an input of an ADC 206 which converts analog signals to digital image data. The elements 202, 204 and 206 of the image sensor 104 are collectively identified as readout circuitry 210. As indicated above, such circuitry will typically be integrated with the pixel array 200 into a common integrated circuit, such as a CMOS integrated circuit.

The analog multiplexer 204 is an example of what is also referred to herein as "analog multiplexing circuitry." The analog multiplexer is configured to selectively apply analog readout signals from different ones of the channels 202 to the input of the ADC 206. The channels 202 may represent, for example, lower speed analog signal processing channels associated with respective columns of the pixel array 200, or with respective analog front end signal paths. These multiple low-speed analog channels share a single high-speed analog channel comprising the ADC 206. The analog multiplexer thus serves as a switching interface between the low-speed analog channels and a high-speed analog channel. It should be noted that the high-speed analog channel may include additional or alternative elements. For example, a high-speed PGA may be coupled between the output of the analog multiplexer and the input of the ADC. Also, although only a single high-speed analog channel is shown in this figure and other figures herein, a given embodiment may include multiple high-speed analog channels, each receiving multiplexed signals from multiple low-speed analog channels.

Figure 3:
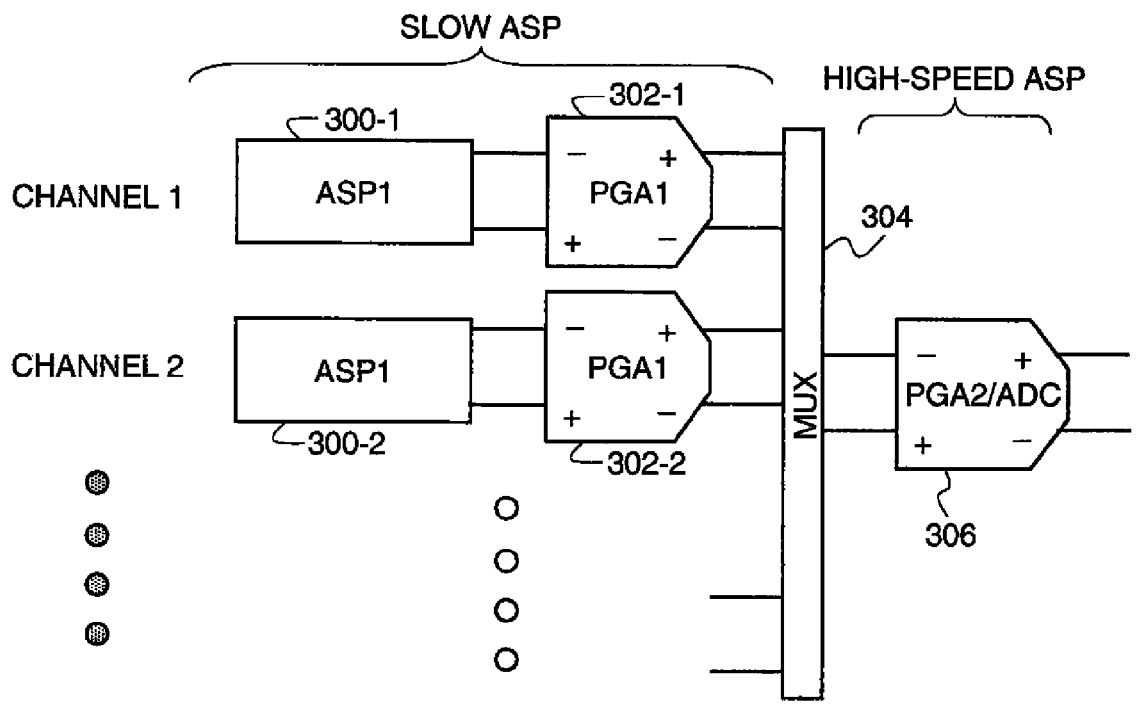
FIG. 3 shows one possible implementation of readout circuitry of the FIG. 2 image sensor.

Referring now to FIG. 3, low-speed analog signal channels are each shown as comprising an ASP 300 coupled to a PGA 302. The two channels explicitly shown in this figure are denoted Channel 1 and Channel 2, although additional channels may be present, as indicated. Each of the ASPs is denoted ASP 1 and provides a pair of output signals to corresponding inputs of one of the PGAs denoted PGA1. The ASPs 300 and PGAs 302 are part of the slow ASP circuitry of the image sensor. The low-speed channels are multiplexed to a single high-speed channel using an analog multiplexer 304. The high-speed ASP circuitry in this embodiment comprises a high-speed channel element 306 which may comprise an ADC, a PGA or a combination of an ADC and a PGA. In the latter type of arrangement, the high-speed PGA may be located between the analog multiplexer 304 and the ADC. The high-speed PGA is denoted PGA2 in the figure. This PGA may alternatively be viewed as comprising a front-end stage of the ADC. Thus, PGA2 may be incorporated into the ADC.

It should be noted that in the embodiments of the invention to be described in conjunction with FIGS. 6 through 9, analog multiplexer 204 may itself incorporate PGA2 or an input stage of the ADC in addition to providing multiplexing functionality.

Figure 4:
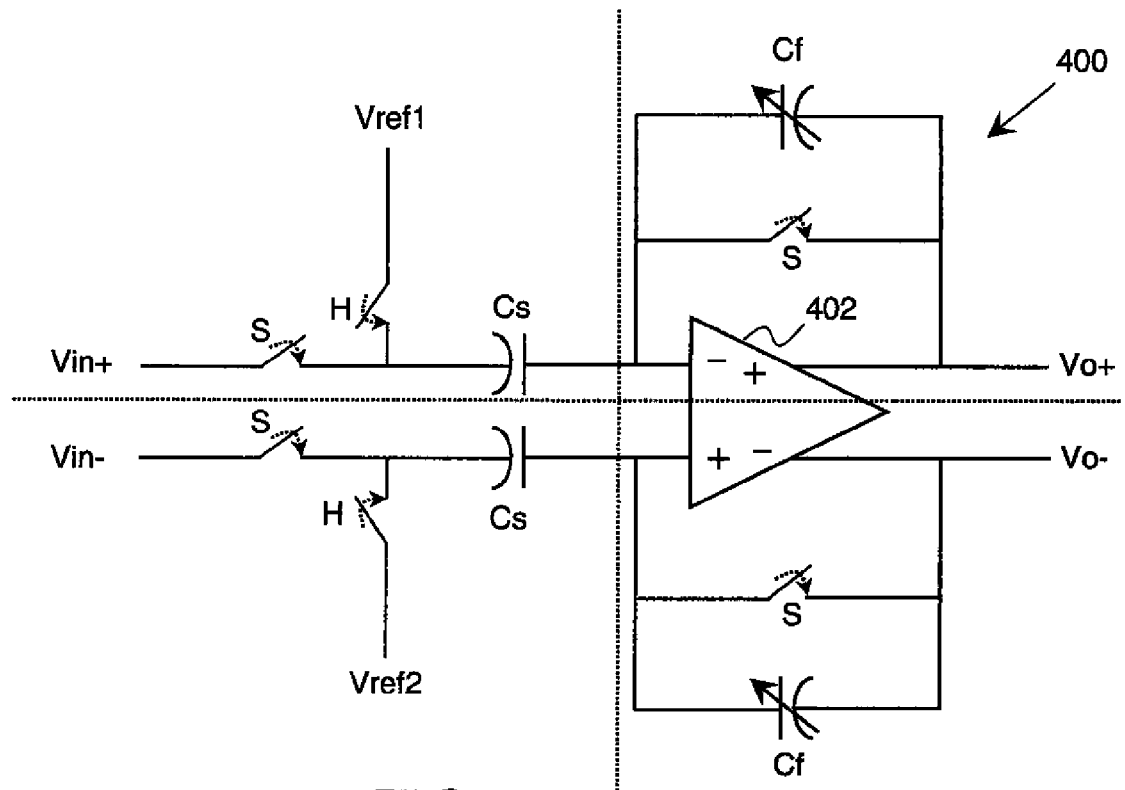
FIG. 4 is a schematic diagram of a PGA of the FIG. 3 readout circuitry.

FIG. 4 shows a PGA 400 that may correspond to either PGA1 or PGA2 of FIG. 3. The PGA 400 comprises a differential amplifier 402, sampling switches S, hold switches H, sampling capacitors Cs and variable feedback capacitors Cf. The inputs to the PGA 400 are denoted Vin+ and Vin−, and the outputs are denoted Vo+ and Vo−. Also associated with the PGA 400 are first and second reference voltages denoted Vref1 and Vref2. The gain is programmable through adjustment of the variable feedback capacitors Cf.

Figure 5:
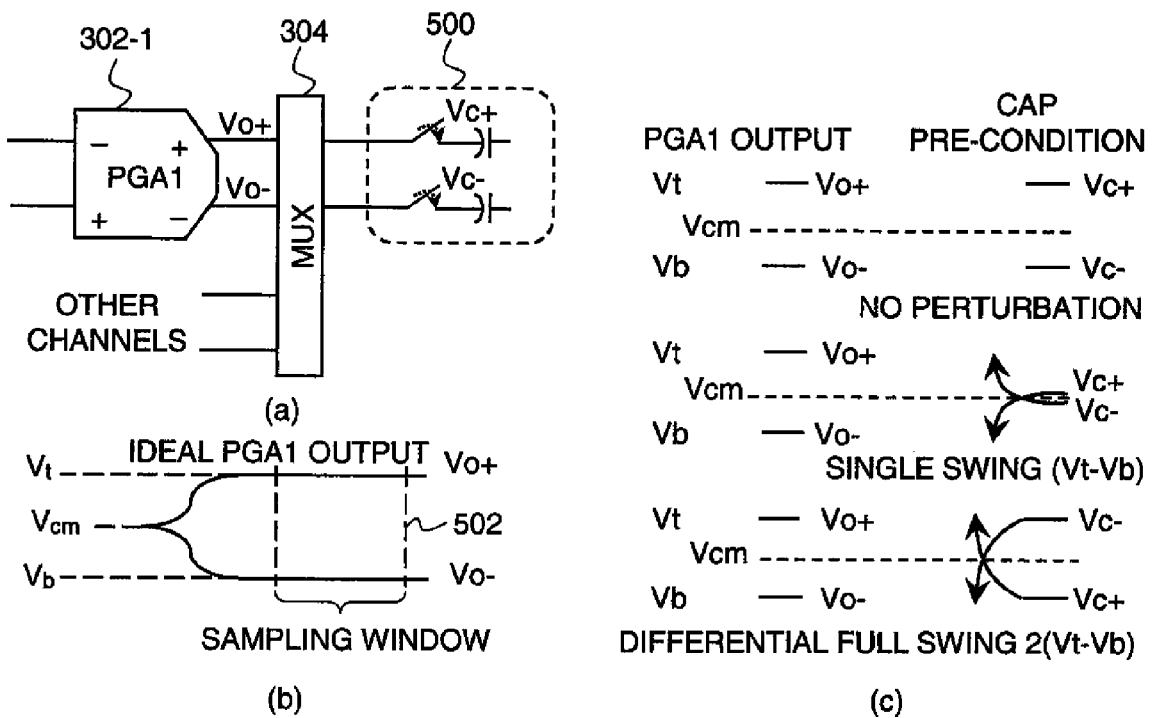
FIG. 5 illustrates an undesirable kickback perturbation that may arise when utilizing the PGA of FIG. 4.

The PGA configuration illustrated in FIG. 4 when utilized in conjunction with analog multiplexer 304 can give rise to a "kickback" perturbation in the readout circuitry 210 due to pre-condition voltages on the input sampling capacitors in the high-speed channel element 306. This kickback perturbation will now be described with reference to FIG. 5.

Assume the analog multiplexer 304 is configured to pass a differential analog signal from PGA1 302-1 to an input sampling stage 500 of PGA2 while all other low-speed channels are blocked as shown in part (a) of the figure. Ideally, as an input signal to the analog multiplexer 304, the PGA1 output should have a wave shape with a maximum signal swing between a top rail voltage Vt and a bottom rail voltage Vb as denoted in part (b) of the figure. A sampling window 502 having a width corresponding to approximately one half of the high-speed clock cycle can be specified within a data ready period.

Part (c) of the figure illustrates the voltage values that may be present at the PGA1 outputs Vo+ and Vo− relative to the corresponding capacitor pre-condition voltages Vc+ and Vc− in the input sampling stage 500. The capacitor pre-condition voltages are the voltages held on the input capacitors just prior to closing of the switches of the input sampling stage 500. There are three different cases illustrated.

In the first case, the capacitor pre-condition voltages Vc+ and Vc− are substantially the same as the respective PGA1 output voltages Vo+ and Vo−. More specifically, the capacitor pre-condition voltages Vc+ and Vc− are Vt and Vb, respectively, and the PGA1 output voltages Vo+ and Vo− are also Vt and Vb, respectively. Thus, there is no significant difference between the PGA1 output voltages and the respective capacitor pre-condition voltages, and thus no perturbation being kicked back to PGA1 via the analog multiplexer 304.

In the second case, the PGA1 output voltages Vo+ and Vo− are again Vt and Vb, respectively, but the capacitor pre-condition voltages Vc+ and Vc− are both near a common mode voltage Vcm. Therefore, PGA1 has to drive a single rail-to-rail swing, that is, Vt−Vb, which can lead to some amount of kickback perturbation.

In the third case, the PGA1 output voltages Vo+ and Vo− are again Vt and Vb, respectively, but the capacitor pre-condition voltages Vc+ and Vc− are Vb and Vt, respectively, and thus of opposite polarity relative to the PGA1 output voltages Vo+ and Vo−. Therefore, PGA1 has to drive a full differential swing given by 2(Vt−Vb), which leads to the worst-case amount of kickback perturbation.

Thus, in the second and third cases described above, differences between the capacitor pre-condition voltages and the corresponding output voltages of PGA1 give rise to a kickback perturbation that is passed through the analog multiplexer 304 and back to PGA1. PGA1 has to resolve this perturbation and drive the output to reach a full signal settling within a half-cycle of the high-speed clock used in PGA2. Similar kickback perturbations can arise when each of the other low-speed analog channels is connected to the input sampling stage 500 of PGA2 via the analog multiplexer 304.

One possible way to address kickback perturbation is to design the low-speed PGA1 to have substantially the same bandwidth and settling time performance as the high-speed PGA2. However, this approach is problematic in that it increases power consumption and die size in the image sensor, thereby negatively impacting performance and cost. Furthermore, even if PGA1 is designed to have the same bandwidth and settling time as PGA2, PGA1 will still need additional time to resolve the kickback perturbation. Therefore, in a worst-case scenario, PGA1 may be unable to reach signal settling even if it uses the same amplifier design as PGA2.

The present embodiment substantially eliminates kickback perturbation by configuring the analog multiplexer 204 to prevent any such perturbation from reaching the low-speed PGA. The analog multiplexer 204 in this embodiment is therefore referred to herein as a kickback-free analog multiplexer. This advantageously allows the low-speed PGA1 to be implemented with reduced bandwidth and settling time performance, leading to decreased power consumption and die size.

Figure 6:
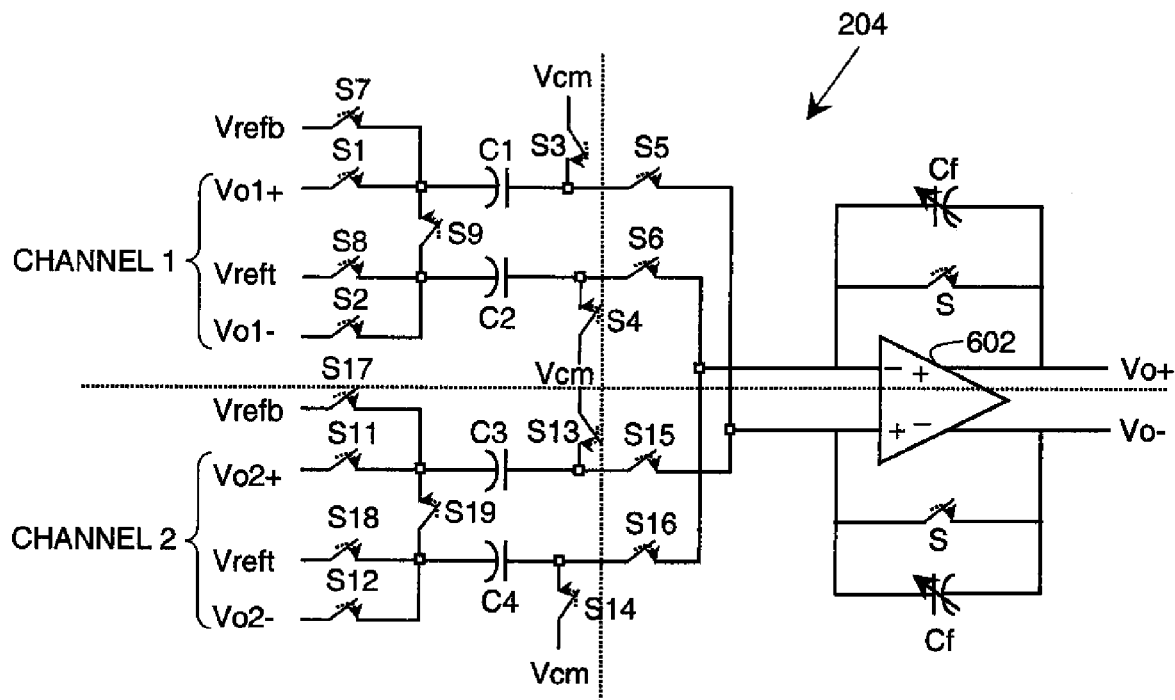
FIG. 6 is a schematic diagram of an illustrative embodiment of the analog multiplexer of FIG. 2 as configured to substantially eliminate the kickback perturbation described in conjunction with FIG. 5.

FIG. 6 shows analog multiplexer 204 as configured to substantially eliminate kickback perturbation. The operation of the multiplexer is illustrated for two channels, denoted Channel 1 and Channel 2, but the techniques described can be extended in a straightforward manner to handle a larger number of channels. In this embodiment, the analog multiplexer 204 combines kickback-free analog multiplexing functionality with the sampling and programmable gain functionality of a high-speed PGA such as PGA2 previously described herein. It will be assumed for purposes of the following description that the analog multiplexer 204 incorporates PGA2.

The analog multiplexer 204 as shown in FIG. 6 includes a differential amplifier 602, sampling capacitors C1, C2, C3 and C4, sampling switches S and variable feedback capacitors Cf. The Channel 1 inputs to the analog multiplexer 204 are assumed to correspond to outputs of a first one of the low-speed PGAs PGA1 and are denoted Vo1+ and Vo1−. Similarly, the Channel 2 inputs to the analog multiplexer 204 correspond to outputs of a second one of the low-speed PGAs PGA1 and are denoted Vo2+ and Vo2−. Also associated with the analog multiplexer 204 are first and second reference voltages denoted Vreft and Vrefb, and a common mode voltage denoted Vcm. As in the low-speed PGA of FIG. 4, the gain of amplifier 602 is programmable through adjustment of the variable feedback capacitors Cf It is assumed that amplifier 602 operates in two modes, a reset and sampling (rst/sample) mode and an amplification mode. The latter mode is also referred to herein as a gain mode.

The first and second channels of the analog multiplexer 204 further comprise respective sets of switches S1 through S9 and S11 through S19. Switches S1 through S9 collectively provide signal processing functions for the differential signals of Channel 1, while switches S11 through S19 collectively provide the same signal processing functions for the differential signals of Channel 2. Switches performing analogous functions are labeled similarly in the figure. Thus, switches S1 and S11 provide analogous functions for respective Channels 1 and 2, as do switches S2 and S12, S3 and S13, and so on.

Figure 7:
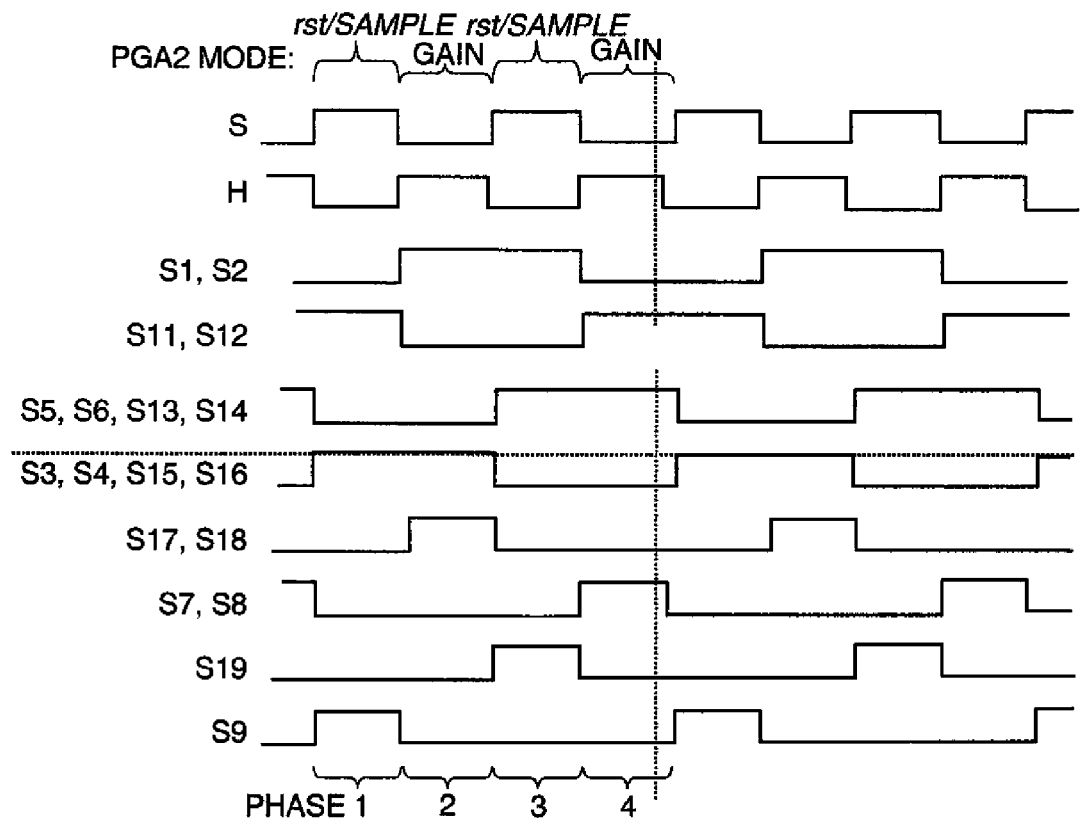
FIG. 7 is a timing diagram illustrating the operation of the kickback-free analog multiplexer of FIG. 6.

FIG. 7 is a timing diagram illustrating the operation of the analog multiplexer 204. The timing diagram shows control signals applied to the switches S, S1-S9 and S11-S19 as a function of time. Also shown is a control signal applied to hold switches H that are not utilized in the FIG. 6 embodiment but are utilized in the embodiments of FIGS. 8 and 9. It is assumed that when a given such control signal is at a logic high level, any switches which receive that control signal are in a closed state. Similarly, when a given control signal is at a logic low level, any switches which receive that control signal are in an open state. This is by way of example only, and other switching and control signal arrangements may be used in alternative embodiments. As is apparent from the timing diagram, certain switches receive the same control signal. For example, switches S1 and S2 both receive the same control signal, switches S11 and S12 both receive the same control signal, switches S5, S6, S13 and S14 all receive the same control signal, and so on.

The control signal applied to the S switches may be viewed as a fast clock signal associated with the high-speed amplification portion of the analog multiplexer 204. It is also referred to as a high-speed clock signal, and is an example of what is more generally referred to herein as a "sampling clock" of the amplifier 602. It should be noted with regard to the FIG. 7 timing diagram that certain of the slower control signals are offset from one another by a half-cycle of this fast clock signal. For example, the control signal associated with switches S5 and S6 is offset from the control signal associated with switches S1 and S2 by a half-cycle of the fast clock signal.

The references to "fast" or "high-speed" herein are intended as relative terns, for example, to distinguish the operating rate of PGA2 from the "slow" or "low-speed" operating rate of PGA1. These terms should not be construed as limiting the associated circuitry to particular operating rates or ranges of operating rates.

There are four distinct phases of operation illustrated in the FIG. 7 timing diagram, denoted Phase 1 through Phase 4. These phases will be described with reference primarily to Channel 1. The Channel 2 processing is similar to that described for Channel 1, but utilizes switches S11 through S19 rather than switches S1 through S9, and sampling capacitors C3 and C4 instead of sampling capacitors C1 and C2.

In Phase 1, input switches SI and S2 and output switches S5 and S6 are open, which isolates the sampling capacitors C1 and C2 from the input signals Vo1+ and Vo1−. The top plates of the capacitors C1 and C2 are connected to the common mode voltage Vcm through switches S3 and S4, respectively. Switch S9 is closed, shorting the bottom plates of C1 and C2 together. This phase serves as a clean-up process to neutralize any signals remaining on C1 and C2 from the previous phase. In most situations, the signals remaining on the sampling capacitors are also symmetric about Vcm.

In Phase 2, input switches S1 and S2 are closed, output switches S5 and S6 remain open, switches S3 and S4 remain closed, and switch S9 is open. The input signals Vo1+ and Vo1− are loaded onto the bottom plates of the sampling capacitors C1 and C2 through switches S1 and S2. The top plates of C1 and C2 remain connected to Vcm through S3 and S4. Since S5 and S6 remain open, the input signals are sampled without the capacitors being coupled to the inputs of the differential amplifier 602.

In Phase 3, the input switches S1 and S2 remain closed, such that the sampling capacitors C1 and C2 are still sampling the input signals Vo1+ and Vo1−. However, the switches S3 and S4 are open, such that the top plates of C1 and C2 are no longer connected to Vcm. The switches S5 and S6 are closed, which connects the top plates of C1 and C2 to the inputs of the differential amplifier 602. The amplifier is in its reset and sampling mode, with the two switches S being closed. Thus, during the transition from Phase 2 to Phase 3, the top plates of C1 and C2 will be switched from Vem to amplifier virtual ground. As the amplifier virtual ground is typically very close to Vcm, there is little or no perturbation kicking back to the bottom plates of C1 and C2 and thus to the outputs of the low-speed PGA1 of Channel 1.

In Phase 4, the amplifier 602 is in its amplification mode. The switches S, S1, S2, S3, S4 and S9 are open. The switches S5 and S6 remain closed. The switches S7 and S8 are closed, connecting the bottom plates of sampling capacitors C1 and C2 to respective reference voltages Vreft and Vrefb. The charges holding on C1 and C2 are transferred onto the corresponding feedback capacitors Cf, realizing the differential gain function for the input signals Vo1+ and Vo1−.

As indicated above, Channel 2 processing is carried out in substantially the same manner as described above for Channel 1, but using the switches S11 through S19 and sampling capacitors C3 and C4.

The analog multiplexer 204 advantageously eliminates differences between input signal voltages and respective capacitor pre-condition voltages, thereby allowing input signals from low-speed analog channels to be smoothly transferred into a high-speed channel without kickback perturbation. As a result, the bandwidth and settling time requirements of the low-speed PGA1 can be relaxed to values consistent with its own slower operating rate, leading to a power and area efficient configuration for the image sensor 104. The analog multiplexer also substantially eliminates any memory effect which could otherwise arise when residual signals from a first channel adversely influence the signal processing for a second channel after the multiplexer switches from the first channel to the second channel.

The particular embodiment of analog multiplexing circuitry shown in FIG. 6 is presented by way of illustrative example only, and the kickback-free multiplexing techniques of the invention can be implemented in alternative circuitry arrangements.

Figure 8:
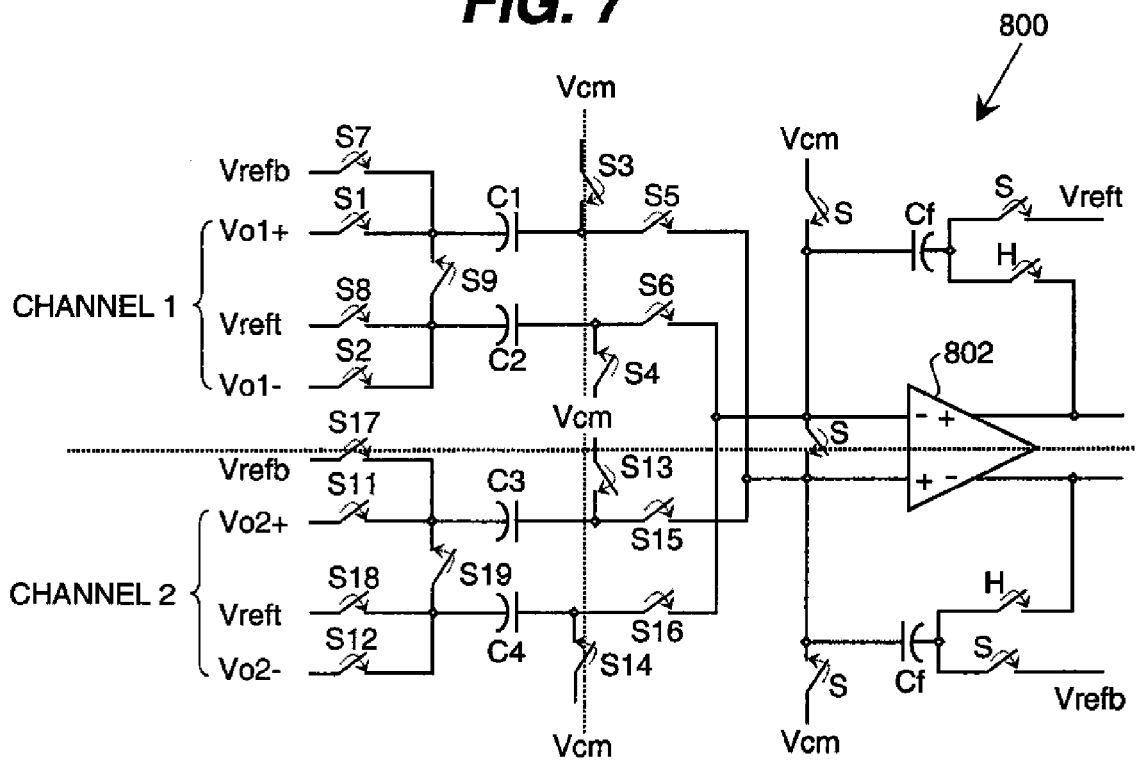
FIG. 8 is a schematic diagram of a second illustrative embodiment of a kickback-free analog multiplexer in accordance with the invention.

FIG. 8 shows an illustrative embodiment comprising an analog multiplexer 800 configured with an output referenced offset cancellation feature. The analog multiplexer 800 in this embodiment includes switches S1-S9 and S11-S19 and sampling capacitors C1-C4 arranged in the same manner as in the FIG. 6 embodiment. However, differential amplifier 802 has five associated sampling switches S and two hold switches H. The operation of the multiplexer 800 is similar to that of the FIG. 6 embodiment, except that during the transition from Phase 2 to Phase 3, the top plates of the sampling capacitors C1 and C2 and the input nodes of the amplifier 802 will be forced to Vcm and clamped together. Such an embodiment facilitates the provision of a flexible reference shifting function. Like the FIG. 6 embodiment, this embodiment is also substantially kickback-free, in that no significant perturbation is kicked back to the low-speed channels that drive the multiplexer inputs.

Figure 9:
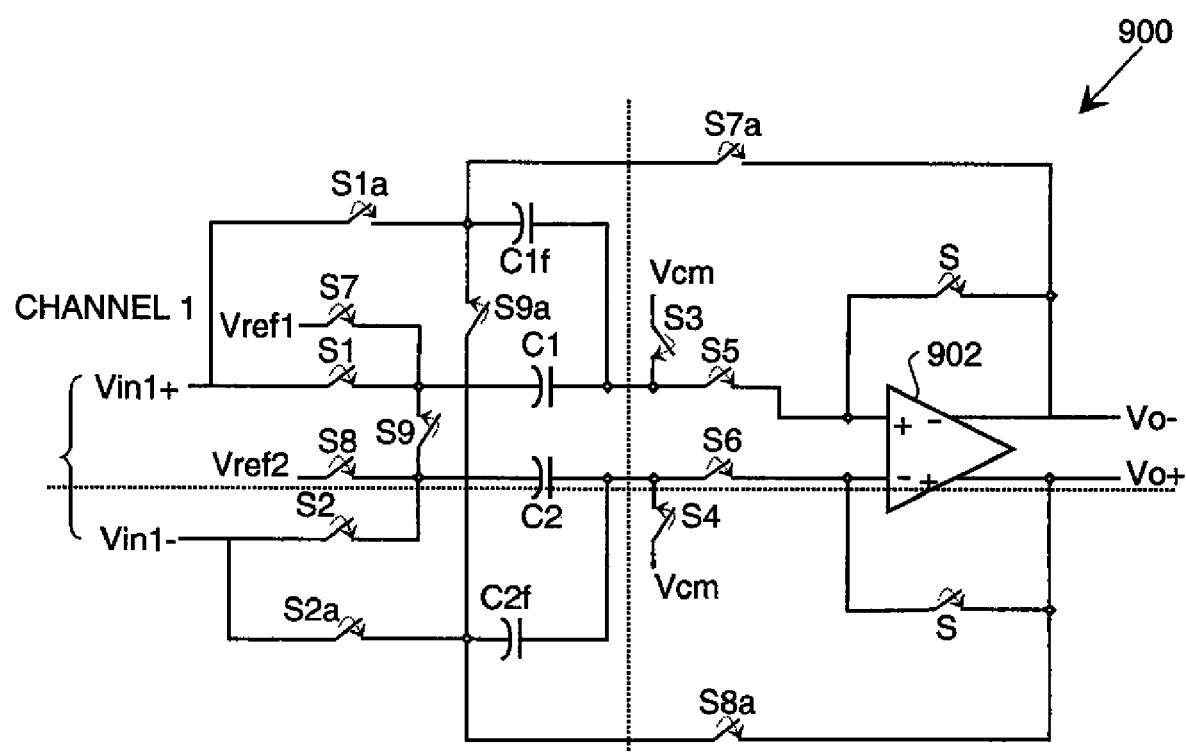
FIG. 9 is a schematic diagram of a third illustrative embodiment of a kickback-free analog multiplexer in accordance with the invention.

FIG. 9 shows another illustrative embodiment in which an analog multiplexer 900 is implemented in an input sampling stage of a high-speed ADC. The multiplexer includes a differential amplifier 902 with associated sampling switches S. In this embodiment, feedback capacitors C1f and C2f are shared as part of respective sampling capacitors C1 and C2. A typical gain-of-two configuration may be provided in multiplexer 900 by setting C1f to the same value as C1 and C2f to the same value as C2. Only one input channel of the multiplexer, namely Channel 1, is shown in the figure, although it is assumed that similar circuitry is provided for each of the other channels.

Switches S1, S2, S3, S4, S5, S6, S7, S8 and S9 operate in substantially the same manner as in the FIG. 6 embodiment. Additional switches S1a, S2a, S7a, S8a and S9a are operative to allow the feedback capacitors C1f and C2f to be either connected in parallel with their respective sampling capacitors C1 and C2 in a reset and sampling mode or to serve as feedback capacitors for the differential amplifier 902 in an amplification or gain mode. The switches S1a, S2a, S7a, S8a and S9a receive the same control signals as respective switches S1, S2, S7, S8 and S9. Thus, S1a is open when S1 is open and closed when S1 is closed, S2a is open when S2 is open and closed when S2 is closed, and so on. Otherwise the operation is substantially the same as in the FIG. 6 embodiment, and again no significant perturbation is kicked back to the low-speed channels that drive the multiplexer inputs.

The invention has been described in detail with particular reference to certain illustrative embodiments thereof, but it will be understood that variations and modifications can be effected within the scope of the invention as set forth in the appended claims. For example, the invention can be implemented in other types of image sensors and digital imaging devices, using alternative analog multiplexing circuitry. Also, as indicated previously herein, a given analog multiplexer configured in accordance with the invention can be utilized in more generic analog signal processing circuits and other applications not involving image sensor readout. These and other alternative embodiments will be readily apparent to those skilled in the art.

Parts List 100 digital camera
102 imaging stage
104 image sensor
106 processor
108 memory
110 display
112 input/output (I/O) elements
200 pixel array
202 analog signal channel
204 analog multiplexer
206 analog-to-digital converter (ADC)
210 readout circuitry
300 analog signal processor (ASP)
302 low-speed programmable gain amplifier (PGA)
304 analog multiplexer
306 high-speed channel element
400 low-speed or high-speed PGA
402 differential amplifier
500 input sampling stage
502 sampling window
602 differential amplifier
800 analog multiplexer
802 differential amplifier
900 analog multiplexer
902 differential amplifier

The invention claimed is:

1. An analog multiplexer for multiplexing a plurality of input analog signal channels into a single output analog signal channel, the multiplexer comprising:

a plurality of input sampling circuits associated with respective ones of the input analog signal channels, the input sampling circuits each comprising positive and negative inputs coupled to respective positive and negative differential signal lines of a corresponding input analog signal channel; and a differential amplifier having positive and negative inputs controllably connectable in turn to each of the input sampling circuits;

wherein the analog multiplexer is further configured to connect the positive and negative inputs of a given input sampling circuit to respective first plates of respective first and second sampling capacitors at a predetermined time prior to connecting respective second plates of the first and second sampling capacitors to the respective positive and negative inputs of the differential amplifier;

wherein the predetermined time is less than a full clock cycle of a sampling clock of the amplifier; and wherein the given input sampling circuit comprises:

a positive signal path having a first switch coupled between the positive input of the input sampling circuit and a first plate of a first sampling capacitor;

a negative signal path having a second switch coupled between the negative input of the input sampling circuit and a first plate of a second sampling capacitor;

third and fourth switches coupled between respective second plates of the first and second sampling capacitors and a common mode voltage reference; and fifth and sixth switches arranged in series with the respective first and second switches and the respective first and second sampling capacitors in the respective positive and negative signal paths and coupled between the respective second plates of the first and second sampling capacitors and the respective positive and negative inputs of the differential amplifier.

2. The multiplexer of claim 1 wherein the amplifier is operated at a sampling speed which is greater than a sampling speed of the input sampling circuits.

3. The multiplexer of claim 2 wherein the sampling speed of the amplifier is at least twice the sampling speed of the input sampling circuits.

4. The multiplexer of claim 2 wherein the predetermined time is approximately one half of the full clock cycle of the sampling clock of the amplifier.

5. The multiplexer of claim 1 wherein at least one of the input analog signal channels comprises a programmable gain amplifier.

6. The multiplexer of claim 1 wherein the sampling element comprises a sampling capacitor and a first plate of the sampling capacitor is connected to the given input analog signal channel at the predetermined time prior to a second plate of the sampling capacitor being connected to the input of the amplifier.

7. The multiplexer of claim 1 wherein the given input sampling circuit further comprises:
   seventh and eighth switches coupled between the respective first plates of the first and second sampling capacitors and respective upper and lower voltage references; and
   a ninth switch coupled between the respective first plates of the first and second sampling capacitors.

8. The multiplexer of claim 7 wherein in a given phase of operation of the multiplexer the third, fourth and ninth switches are closed, and the first, second, fifth, sixth, seventh and eighth switches are open, such that the positive and negative inputs of the input sampling circuit are disconnected from the respective first plates of the respective first and second sampling capacitors, the first plates of the first and second sampling capacitors are connected to one another, the second plates of the first and second sampling capacitors are connected to the common mode voltage reference, and the second plates of the first and second sampling capacitors are disconnected from the respective positive and negative inputs of the differential amplifier.

9. The multiplexer of claim 7 wherein in a given phase of operation of the multiplexer the first, second, third and fourth switches are closed, and the fifth, sixth, seventh, eighth and ninth switches are open, such that the positive and negative inputs of the input sampling circuit are connected to the respective first plates of the respective first and second sampling capacitors, and the second plates of the first and second sampling capacitors are disconnected from the respective positive and negative inputs of the differential amplifier and connected to the common mode voltage reference.

10. The multiplexer of claim 7 wherein in a given phase of operation of the multiplexer the first, second, fifth and sixth switches are closed and the third, fourth, seventh, eighth and ninth switches are open, such that the positive and negative inputs of the input sampling circuit are connected to the respective first plates of the respective first and second sampling capacitors, and the second plates of the first and second sampling capacitors are connected to the respective positive and negative inputs of the differential amplifier.

11. The multiplexer of claim 7 wherein in a given phase of operation of the multiplexer the fifth, sixth, seventh and eighth switches are closed and the first, second, third, fourth and ninth switches are open, such that the positive and negative inputs of the input sampling circuit are disconnected from the respective first plates of the respective first and second sampling capacitors, the first plates of the respective first and second sampling capacitors are connected to the respective upper and lower voltage references, and the second plates of the first and second sampling capacitors are connected to the respective positive and negative inputs of the differential amplifier.

12. The multiplexer of claim 1 wherein the amplifier is configured to provide output reference offset cancellation.

13. An analog multiplexing method comprising the steps of:
   receiving a plurality of input analog signal channels on respective positive and negative differential signal lines of each input analog signal channel; and
   combining the plurality of input analog signal channels into a single output analog signal channel in an analog multiplexer comprising a plurality of input sampling circuits associated with respective ones of the input analog signal channels and a differential amplifier having positive and negative inputs controllably connectable in turn to each of the input sampling circuits;
   wherein in conjunction with the combining step at least a given one of the input analog signal channels is connected to a sampling element of its corresponding input sampling circuit at a predetermined time prior to connecting the sampling element of that input sampling circuit to the input of the amplifier;
   wherein the predetermined time is less than a full clock cycle of a sampling clock of the amplifier; and wherein the combining further comprises:
   coupling positive and negative differential signal lines of a corresponding input analog signal channel with first plates of first and second sampling capacitors through closed first and second switches while second plates of the first and second sampling capacitors are coupled to a common mode voltage reference through closed third and forth switches and while open fifth and sixth switches decouple the second plates from respective positive and negative inputs of the differential amplifier;
   sampling the positive and negative input signals through closed fifth and sixth switches coupling the second plates of the first and second sampling capacitors to the respective positive and negative inputs of the differential amplifier while open third and fourth switches decouple the second plates from the common mode voltage; and
   opening the first and second switches to decouple the first plates of first and second sampling capacitors from the input analog signal channel while charge is transferred from the first and second capacitors for amplification by the differential amplifier.

14. The method of claim 13 wherein the combining further comprises neturalizing signals remaining on the first and second sampling capacitors by coupling the first plates to the common mode voltage reference through closed third and fourth switches while the first, second, fifth and sixth switches are open.

15. An image sensor comprising:
   a pixel array; and
   readout circuitry coupled to the pixel array;
   the readout circuitry comprising an analog multiplexer configured to multiplex a plurality of input analog signal channels into a single output analog signal channel;
   the analog multiplexer comprising a plurality of input sampling circuits associated with respective ones of the input analog signal channels and a differential amplifier having positive and negative inputs controllably connectable in turn to each of the input sampling circuits, the sampling circuits each comprising positive and negative inputs coupled to respective positive and negative differential signal lines of a corresponding input analog signal channel;

wherein the analog multiplexer is further configured to connect the positive and negative inputs of a given input sampling circuit to respective first plates of respective first and second sampling capacitors at the predetermined time prior to connecting respective second plates of the first and second sampling capacitors to the respective positive and negative inputs of the differential amplifier;

wherein the predetermined time is less than a full clock cycle of a sampling clock of the amplifier; and wherein the given input sampling circuit comprises:

a positive signal path having a first switch coupled between the positive input of the input sampling circuit and a first plate of a first sampling capacitor;

a negative signal path having a second switch coupled between the negative input of the input sampling circuit and a first plate of a second sampling capacitor;

third and fourth switches coupled between respective second plates of the first and second sampling capacitors and a common mode voltage reference; and fifth and sixth switches arranged in series with the respective first and second switches and the respective first and second sampling capacitors in the respective positive and negative signal paths and coupled between the respective second plates of the first and second sampling capacitors and the respective positive and negative inputs of the differential amplifier.

16. The image sensor of claim 15 wherein the readout circuitry further comprises an analog-to-digital converter and the amplifier is implemented in an input sampling stage of the analog-to-digital converter.

17. A digital imaging device comprising the image sensor of claim 16.

* * * * *